Aug. 16, 1938.  D. BRATT  2,127,153

LOCK NUT

Filed May 4, 1936

Inventor
Donald Bratt
By
Cameron, Kerkam & Sutton
Attorneys

Patented Aug. 16, 1938

2,127,153

UNITED STATES PATENT OFFICE 2,127,153

LOCK NUT

Donald Bratt, Goteborg, Sweden

Application May 4, 1936, Serial No. 77,836
In Sweden January 7, 1936

4 Claims. (Cl. 151—21)

In a threaded nut the helical lines forming the threads can be considered as being generated by an imaginary point revolving with a uniform angular velocity about and at a constant radial distance from an axis of rotation and at the same time having a uniform velocity parallel with said axis. If the pitch of the thread is defined as the ratio between a change in the perpendicular distance from a certain base plane and a corresponding change in the angle of revolution of the radius, when the generating point is moved from one position to an adjacent one along the helical line, it is a characteristic feature of such threads that the pitch so defined is constant at all points of the thread. In ordinary standard nuts the axis of rotation is stationary in relation to the base plane and the axis of the threading is straight and perpendicular to said plane.

In certain lock-nuts the thread is of the ordinary standard type whereas the underside of the nut is cut at an angle with the base plane so that in tightening the nut against a support the bolt is slightly deformed on account of bending stresses which means that a certain deformation energy is required for turning the nut. In this way a locking action is caused in addition to the friction between the bolt and the nut and between the latter and the support.

It has also been proposed to arrange the threads in a lock-nut in such a way that, in generating the thread, the axis of rotation performs a reciprocating lateral movement parallel to the base plane whereby the axis of the thread will be curved. In nuts of the latter type the bolt material is subjected to shear stresses which vary between maximum values at the top and bottom of the bolt portion inserted in the nut and zero values at the middle of said portion.

Both types of lock-nuts are characterized by the fact that the deformation necessary to cause the locking action is concentrated to certain parts of the bolt portion engaged by the nut so that the bolt is likely to be injured.

The present invention has for its object to provide a lock-nut in which the bolt portion engaged by the nut is subjected exclusively to shear stresses which are of a precalculable nature and uniformly distributed. The invention consists substantially in that the axis of the thread is rectilinear and forms an oblique angle with the base plane identified above.

The invention will now be more fully described with reference to the accompanying drawing in which Fig. 1 diagrammatically illustrates the geometrical properties of the thread in ordinary nuts and Fig. 2 the corresponding properties in a nut according to the invention.

Figure 1:
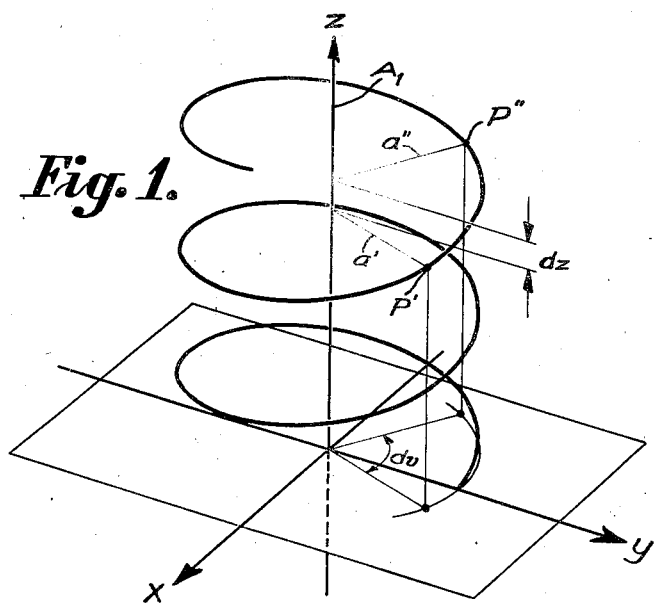

An ordinary standard nut thread is generated, as illustrated in Fig. 1, by the revolving of an imaginary point P at a uniform angular velocity about an axis of rotation $A_1$ at the radial distance $a$ therefrom and the simultaneous displacement of said point at a uniform velocity parallel to said axis. The axis of rotation $A_1$ is perpendicular to a base plane, such as the $xy$-plane in a system of perpendicular axes $xyz$. When the point P moves from the position P' to the position P'' the perpendicular distance from the base plane $xy$ is increased by the amount $dz$, while at the same time the corresponding radius has moved from the position $a'$ to the position $a''$ and its projection in the $xy$-plane been angularly displaced by the amount $dv$. The pitch as above defined is the ratio between $dz$ and $dv$. At all points of the thread the following rule is valid:

$$\frac{dz}{dv} = \text{constant.} \qquad (1)$$

Figure 2:
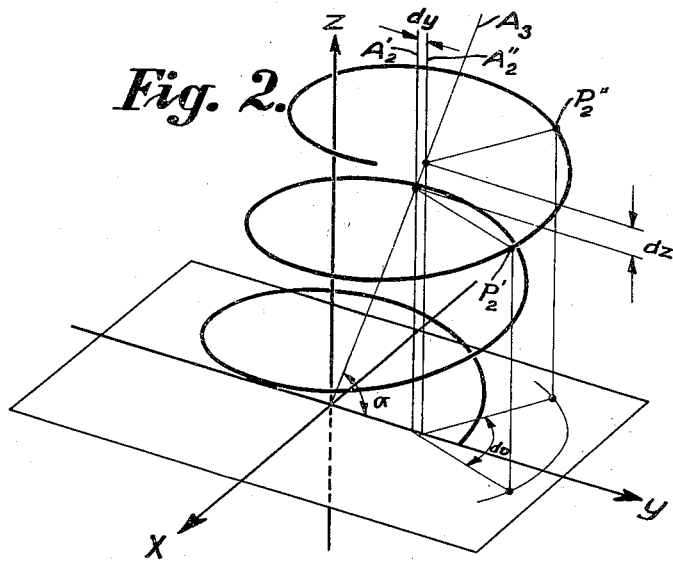

Also in the thread shown in Fig. 2 the pitch $$\frac{dz}{dv}$$

in relation to the base plane $xy$ is constant. The axis of rotation $A_2$ is perpendicular to the base plane $xy$ as in Fig. 1, but, in contradistinction to the latter figure, this axis is displaced a distance $dy$ in the direction of the $y$-axis when the generating point is moved from position P'$_2$ to position P''$_2$. For this displacement $dy$ the following equation is valid:

$$\frac{dy}{dv} = \text{constant;} \qquad (2)$$

i. e. at all the points of thread the imaginary generating point P$_2$ has a horizontal and uniform component of velocity $$\frac{dy}{dt}$$

in which expression $t$ indicates the time. Hereby the geometrical axis $A_3$ of the thread will form an oblique angle $\alpha$ with the base plane according to the equation $$\tan \alpha = \frac{dz}{dy} = \text{constant.} \qquad (3)$$

Figure 3:
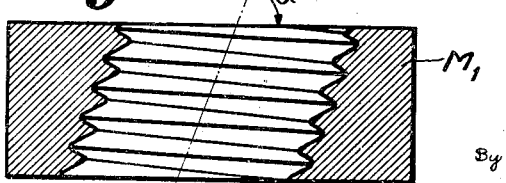
Figure 3 is a section through the latter nut on the $yz$-plane in Fig. 2.

Figure 3 illustrates the appearance of such a thread produced in a nut $M_1$.

From another viewpoint, the present nut can be imagined as produced from an ordinary straight standard nut by subdividing the latter into an infinite number of very thin layers parallel with the end surfaces of the nut and staggering such layers laterally stepwise in the same direction until the geometrical axis of the threading forms the desired oblique angle.

Figure 4:
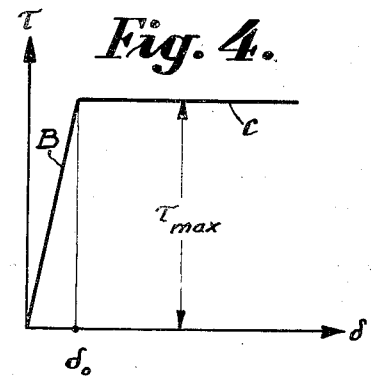
Figure 4 illustrates diagrammatically the conditions in a material such as soft iron when subjected to shear stresses.

In Fig. 4 the relation between the degree of deformation caused by shear stresses and the amplitude of the corresponding stresses for plastic materials, such as soft iron, is illustrated in a very simplified way. At the beginning the required shear stress $\tau$, counted as units of force per unit of surface, increases in direct proportion to the deformation $\delta$ caused thereby. When the deformation reaches a certain value $\delta_0$, called the yield point, the shear does not increase any more but remains constant and equal to $\tau_{max}$. The raising portion B of the curve corresponds to so called elastic deformation and the horizontal branch C to so called plastic deformation. The difference resides in that the elastic deformation entirely or partially disappears at the ceasing of the stress whereas the plastic deformation remains also after the stress has ceased. In such lock-nuts as are based on other locking action than pure friction, only deformations exceeding the value $\delta_0$ or the yield point are of importance for causing the locking action.

Figure 5:
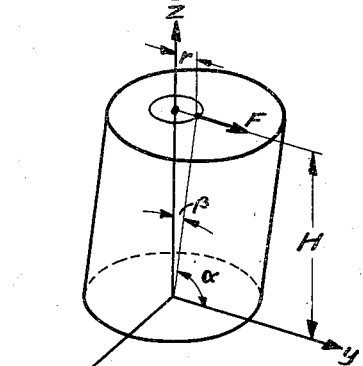
Figure 5 illustrates diagrammatically the shear deformation energy required in a bolt which has been threaded into a nut according to the present invention.

The conditions in a nut according to the invention will now be mathematically treated with reference to Fig. 5. In this figure a cylinder $D_1$ is shown in perspective view, the diameter of which cylinder corresponds to the core diameter of the threaded bolt. The cylinder is oblique and is imagined to have been produced from a straight cylinder through a uniform shear of its elements in the direction of the $y$-axis. The cylinder shown corresponds to that portion of the bolt which is inside the nut. When the nut is turned the central line of the cylinder describes a conical surface, the intersection of which with the upper surface of the cylinder is constituted by a circle having the radius R equal to $H \cdot \beta$ in which $\beta$ is the supplement angle in relation to the angle $\alpha$ and of a small magnitude whereas H is the height of the cylinder. The resultant F of the shear stresses multiplied by the displacement $r$ is a measure of the exterior couple of forces which must be applied to deform the bolt. This product $F \cdot r$ is, in other words, a measure of the interior locking couple, not including the locking action caused by the friction in the thread and against the support.

Figure 6:
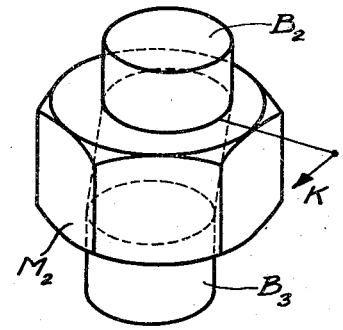
Figure 6 illustrates in a perspective view the conditions in a bolt which has been screwed into a nut according to the present invention.

In Figure 6 there is shown a nut $M_2$ which has been threaded on to a part of the bolt $B_2$. On account of the shear caused by the nut the bolt is deformed so that the upper portion $B_2$ of the bolt is laterally offset in relation to its lower portion $B_3$.

Provided the friction in the thread is neglected, the nut can be forced to rotate by applying an exterior couple K which is at least $$K = F \cdot r = \pi \cdot R^2 \tau_{max} \cdot r \qquad (4)$$

in which R is the net radius of the bolt and $\tau_{max}$ the shear at the yield point in units of force per units of section area.

The most important advantages of a nut according to the invention are the following:

1. All elements of volume of the bolt enclosed by the nut co-operate in equal measure to the production of the total internal locking couple whereby the bolt material is utilized in the best manner.

2. The contact surface in the thread between bolt and nut is loaded as uniformly as possible whereby local injuries are practically eliminated.

3. During the screwing-on operation the lower surface of the nut remains perpendicular to that part of the bolt which has not yet been screwed into the nut.

4. The tolerances of the nut and bolt have the least possible influence on the locking action whereby a high degree of exchangeability and safety are obtained.

In manufacturing the nut an oblique hole is made in the nut in a direction parallel with the axis of the desired thread, whereupon a tap is inserted in the hole with its axis perpendicular to the base plane. The tap is then given three simultaneous movements in relation to the nut, i. e. a displacement movement parallel with, a rotary movement about, and a lateral movement perpendicular to the tap axis and with a uniform velocity in such a manner that the points of the tap axis describe rectilinear paths parallel with the axis of the desired thread and oblique to the base plane.

In cutting the threads, that point of the tap axis which is the intersection with the tap diameter corresponding to full threads coincides with and is displaced on the geometrical axis of the threading.

What is claimed is:—

1. A threaded lock-nut in which the pitch of the thread, reckoned in relation to a fixed base plane, is constant and the geometrical axis of the thread is rectilinear and oblique to said base plane.

2. A threaded lock-nut in which the geometrical axis of the thread is rectilinear and forms an oblique angle to a base plane and the shape of the helical lines constituting the thread is such that a radius parallel with the base plane and connecting a point of the thread axis with a point of any one of said helical lines is of constant length throughout the thread and that, in regard to two consecutive radii, the ratio between the difference in their perpendicular distances from the base plane and their mutual angular displacement is constant throughout the thread.

3. A nut as claimed in claim 1 in which the base plane is parallel to the end surfaces of the nut.

4. A nut as claimed in claim 1 in which the obliquity of the axis is so selected that the material in a bolt threaded into the nut is subjected to shear exceeding the yield point.

DONALD BRATT.